March 25, 1930.   G. PELLERIN   1,751,713
APPARATUS FOR MELTING FATTY SUBSTANCES
Filed April 5, 1927

G. Pellerin
INVENTOR

By Marks & Clark
Attys.

Patented Mar. 25, 1930

1,751,713

UNITED STATES PATENT OFFICE

GEORGES PELLERIN, OF MALAUNAY, FRANCE

APPARATUS FOR MELTING FATTY SUBSTANCES

Application filed April 5, 1927, Serial No. 181,251, and in France April 22, 1926.

The present invention relates to an apparatus adapted for the melting of solid substances such as oleo, suet, cocose, lard, the concrete oils, and the like, which are received in barrels and are employed for the manufacture of oleomargarine, soap grease and like products, said apparatus being arranged for a simple and rapid execution of the work.

The said apparatus, comprises a vessel which is provided with substantially vertical partitions, and whose internal walls are so disposed that the action of gravity will assure the evacuation of the melted parts and also a constant and extensive contact beteween the substance to be melted and the said walls which are suitably heated, whilst the partitions will automatically cut up the mass under treatment which descends in the said vessel. The said partitions are preferably heated like the other wall of the vessel in order to facilitate the cutting of the mass of material and to further the melting of said material by supplying the heat directly to its central part.

The appended drawings show by way of example an embodiment of the said invention.

Figure 1:
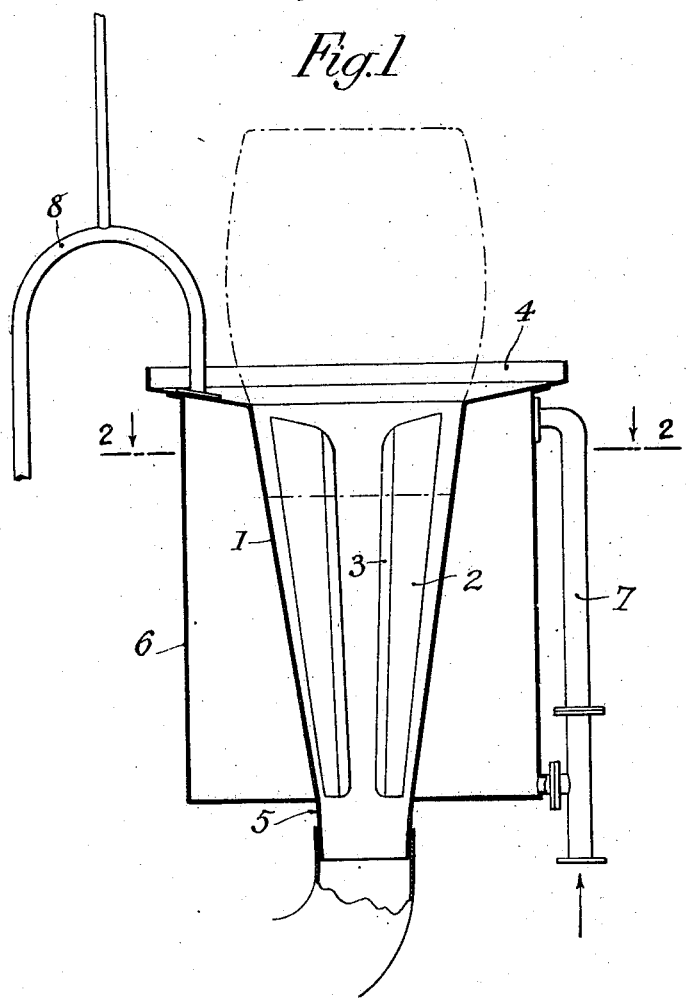
Fig. 1 is a vertical section of the apparatus.
Figure 2:
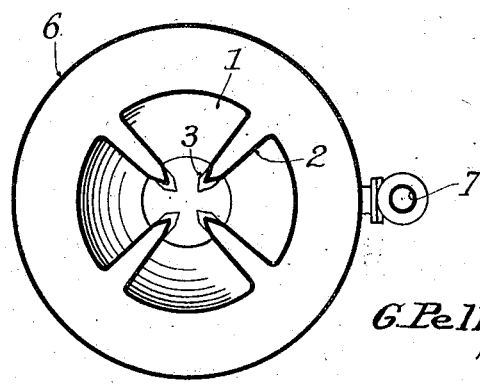
Fig. 2 is a horizontal section on the line 2—2 of Fig. 1.

The said apparatus comprises a vessel 1 of tapered form containing in the interior suitable hollow partitions or ribs 2 whose edges 3 of triangular section form cutting portions extending towards the centre of said vessel.

On the top of said vessel is mounted a large frusto-conical container 4 the vessel having at the bottom a conduit 5 for the discharge of the melted material into a lower trough, not shown. Around the vessel 1 is disposed an envelope 6 forming a jacket adapted to contain a suitable heating fluid which is circulated by means of the pipes 7—8.

The heating fluid may consist of hot water which is circulated by a water elevating device employing steam, or by other physical or mechanical means offering the necessary rapid circulation and the proper contact with the surfaces; steam alone might be employed, although its use is more complicated by reason of the overheating of the fatty substance under treatment which might take place.

The piece of fatty substance to be melted is taken from the barrel and brought by a crane device of any kind above the container 4 and is then placed on the vessel 1. Due to the considerable weight of the piece—for a barrel usually contains 170 kgs. of grease— the latter will descend in the vessel 1 according as its parts melt in contact with the hot walls of the latter, and with the partitions 2.

The edges 3 will readily cut up the piece and it will thus be subjected upon a large surface to the action of the heating fluid, so that it will rapidly melt. All the liquefied parts will at once descend to the bottom.

In addition to a very rapid treatment, the said apparatus further offers certain advantages consisting in the fact that the temperature of the melted substance delivered by the conduit 5 is kept constant, and that by the use of the differences of temperature of the water or of an elevating device for the hot water circulation, this eliminates all mechanical movement which requires adjustment and upkeep. Should steam be used as the heating fluid, the cost will be very small, and in all cases there will be hardly any effort required from the persons loading the apparatus.

Obviously, the invention is not limited to the form of construction herein specified by way of example, and without departing therefrom the form and disposition of the several parts of the apparatus can be suitably modified.

For instance the form, number and arrangement of the partitions 2 and 3 may vary at will according to the nature of the fatty material to be melted, or to its form and volume, or to the greater or less work required.

Having thus described my apparatus, what I claim as new therein, and my own invention, is:—

1. In an apparatus for melting fatty substances the combination of a vessel which is placed vertically and is open at the top and bottom, radial substantially vertical ribs provided in this vessel, the said ribs each being provided with a sharp edge, and a jacket which surrounds the said vessel and forms with the latter an annular chamber for the circulation of a hot fluid.

2. In an apparatus for melting fatty substances, the combination of a vessel which is placed vertically and is open at the top and bottom, hollow radial, substantially vertical ribs provided in this vessel, the said ribs each being provided with a sharp edge, and a jacket which surrounds the said vessel and forms with the latter an annular chamber for the circulation of a hot fluid, the said chamber being in communication with the interior of the said hollow ribs.

3. In an apparatus for melting fatty substances, the combination of a frusto-conical vessel which is placed vertically and is open at the top and bottom, radial ribs in this frusto-conical vessel, the said ribs each being provided with a sharp edge, and a jacket which surrounds the said frusto-conical vessel and forms with the latter an annular chamber for the circulation of a hot fluid.

4. In an apparatus for melting fatty substances, the combination of a vessel which is placed vertically and is open at the top and bottom, a broad container connected with the upper end of the said vessel, radial ribs in the said vessel, the said ribs each being provided with a sharp edge and a jacket surrounding the said recipient and forming with the latter an annular chamber for the circulation of a hot fluid.

In testimony whereof I have hereunto affixed my signature.

GEORGES PELLERIN.